March 2, 1954
E. F. HANSEN
2,670,837
FLEXIBLE TROUGH BELT CONVEYER
Filed Aug. 15, 1952
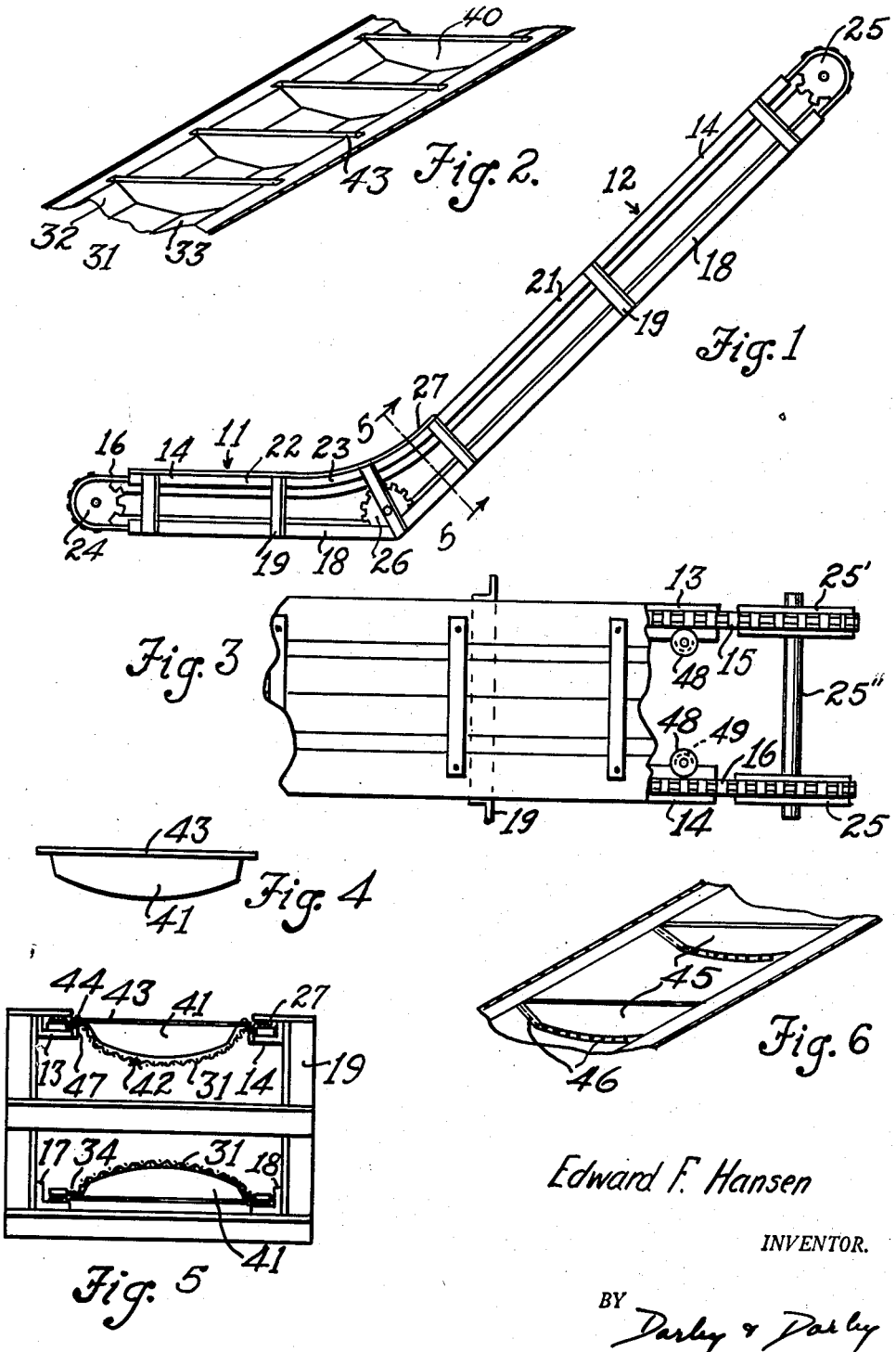
Edward F. Hansen
INVENTOR.
BY Darley & Darley
atty's.

Patented Mar. 2, 1954

2,670,837

UNITED STATES PATENT OFFICE 2,670,837

FLEXIBLE TROUGH BELT CONVEYER

Edward F. Hansen, Stanton, N. J., assignor to The Baker Castor Oil Company, New York, N. Y., a corporation of New Jersey Application August 15, 1952, Serial No. 304,610

7 Claims. (Cl. 198—201)

This invention relates to conveying apparatus, and more particularly to continuous conveying apparatus. It is especially adapted to the continuous and rapid transport of material which consists of quantities or masses of relatively small size, and light weight. The operation of the apparatus is not confined, however, to this particular type of material, as will be apparent from the ensuing description.

The invention is particularly adapted to the transfer and transport from one location or level to another of vegetable seeds, beans, peas, and similar products which at the present time are often continuously conveyed by cumbersome and inefficient methods. These latter devices are relatively slow in operation and are sometimes rough on fragile material; and they are subject to dislocation and unsteady operation after prolonged use. The conveyor of my invention, on the other hand, is capable of high speed operation upon fragile materials for sustained periods of time without damage to the conveyor or to the material conveyed and with a minimum of wear.

The conveyor of my invention may also be assembled inexpensively and its simplicity permits flexibility of installation and operation which has hitherto been considered unattainable. Unusually high elevation and angles of ascent may be attained with minimum breakage of fragile materials. The steep angle of elevation is particularly advantageous since angles as high as 45° from the horizontal may be used, resulting in a compact unit with consequent saving in size and cost of materials and in saving of space. Another advantage of the present invention is that the conveying surfaces are not required to be in direct contact with the driving mechanism, thereby preserving the life of the operating conveying elements.

One or more of the conveyors may be installed angularly or horizontally, in various required combinations, depending upon the requirements of the installation. For example, a horizontal section may convey beans or seeds from one portion of a floor to an inclined elevating conveyor; whereupon the material may be transported upwardly on an inclined plane to a depository or further conveyed horizontally from said depository. The possibility of combining horizontal sections with elevated sections both having the same basic structure, is especially advantageous from the standpoint of economical cost and flexibility of installation. This result cannot be attained by screw conveyors, ordinary belt conveyors, or conveyors of the chain and bucket type.

In general, my conveyor comprises a trough-shaped continuous belt supported on each side by an element which engages a driving wheel or pulley or sprocket, means for maintaining the supporting elements in proper relationship, and transverse spacers or dividing walls which conform to the contour of the trough and thereby form a series of conveying compartments which travel forward or upward or downward as the belt travels. As will be apparent, the supporting elements may conveniently be chains or belts, and the spacing may be accomplished by a series of sprockets over which the chains pass, or tracks in which the chains or belts ride, or a series of pulleys in which the belts are respectively guided in fixed relationship to each other. As will also be apparent from the following description, various arrangements of the continuous conveyor may be accomplished in accordance with the present invention.

Although my invention is not to be construed as limited to any particular construction or embodiment herein described, a present preferred embodiment thereof is shown in the accompanying drawing in which Fig. 1 is a side elevation of the conveyor assembly;

Fig. 2 is a perspective view of one embodiment of the troughed conveying belt;

Fig. 3 is a plan view of one end of the conveying belt;

Fig. 4 is an elevation of a spacing divider;

Fig. 5 is an enlarged section taken along the line 5—5 of Fig. 1; and

Fig. 6 is a perspective view showing a different arrangement of parts of the troughed belt.

Referring to Figs. 1 and 2, the conveyor is shown having two sections 11 and 12 representing respectively, horizontal and inclined sections of a continuous conveyor. An upper pair of angle irons 13 and 14 provide tracks upon which endless chains 15 and 16 are supported during their forward and ascending travel. Corresponding lower tracks in the form of angle irons 17 and 18 are provided for the return and downward portion of travel of the endless chains. The upper track 14 is conveniently connected to the lower track 18 by a series of vertical spacers 19 which may conveniently take the form of angle irons.

The upper track 14 has an inclined straight section 21 which comprises the support and path for the upward travel of the supporting elements or chains 16. The horizontal track section 22 of the upper track is connected to the inclined track 21 by a curved track 23, providing a gradual, smooth and uninterrupted path of travel for the transition from horizontal to upward movement, thereby reducing the likelihood of spilling, upsetting or breaking the material. Of course, the inclined section of the conveyor may be constructed or used alone, or an additional horizontal section may extend beyond the top of the inclined section. Any convenient supporting means, not shown, such as steel or other framework, may be used to support the inclined section 12 of the conveyor.

Sprockets are provided for supporting and for driving the conveyor. Sprocket 24 is, in the embodiment shown in Fig. 1, supported by the usual means (not shown) in line with the horizontal flight of the conveyor, and sprocket 25 is at the uppermost end of the conveyor. One or more intermediate sprockets 26 may be positioned between the end sprockets to guide the return path of the conveyor. The sprockets are preferably mounted in pairs on the same shaft, as shown with sprockets 25, 25' and shaft 25''. As shown in Figs. 1 and 5, an upper guide rail 27 is mounted above the curved angle iron of the intermediate section 23 to hold the chain onto the rails. Other instrumentalities for guiding the chain on its track may of course be used, such as superimposed series of sprockets or wheels. In normal operation, the normal weight of the moving assembly will retain the chains on their respective tracks. At high speeds, however, it has been found advisable to provide auxiliary tracking elements such as shown at 27.

Any usual device may be employed to maintain the moving conveyor belts or chains in taut position. For example, the shaft of the upper sprocket or pulley 25 may be journaled in blocks which slide in a frame so that the sprockets 25 may be moved backward or forward in a direction parallel to the longitudinal paths of the chains. If desired, of course, conventional tightening sprockets or pulleys may be provided whereby the return path of the belt or chain is interrupted or diverted, thereby lengthening said path and taking up the slack. Appropriate driving means, not shown, may be provided in the usual manner, for example, by providing a motor attached to the shaft of sprocket 24. These sprockets are preferably mounted in pairs and keyed to their respective shafts for prevention of warping or distortion of the conveyor in operation.

Referring now to Figs. 2 and 4, the moving conveying belt assembly comprises the endless chains 15 and 16 to which are attached an endless flexible trough 31 which may be provided with side walls 32 and 33 of flexible material. The links of the chain may be conveniently provided with lugs 34 spaced several links apart, to which the flexible troughed belt is attached as by riveting or bolting or clamping or by other suitable means. The trough 31 may be made of any strong, flexible material, the following having been found particularly suitable: convas, rubber, synthetic fiber fabric, wire mesh. When desired to handle wet material or material from which liquid is to be expressed by gravity, the rubber trough may be wholly or partly perforated or foraminous as may be the case with other flexible materials. Conversely, when it is desired to prevent escape of liquid or of extremely small particles or dust, a rubber coated canvas may conveniently be used. When heavy material is to be transported by the conveyor, reinforced material may be used, including wire and reinforced fabric.

As shown in Figs. 2, 4 and 5, spacers or dividing walls 40 or 41 are arranged transversely in series to form an endless train of conveying compartments. The spacer 40 or 41 may be seen to conform to the contour of the surface of the trough 31. The spacer 41 has an upper rigid strip 43, conveniently integral with the spacer, which may serve as a brace when riveted at 44 through the fabric to a lug 34 on the chain. When handling fragile materials, it has been found desirable to provide a small space, of the order of ¼" to ¾" at 42 between the dividing wall 41 and belt trough 31. When the dividing walls 41 are made of metal or other rigid material, there is an additional advantage in providing said space, in order to preserve the surface of the travelling belt trough by minimizing wear. As may be seen in the lower section of Fig. 5, on the return trip when the flexible trough is inverted, the spacers 41 may serve to hold the canvas or other material in relaxed inverted or upright position, thereby keeping it from becoming torn or entangled in the rigid frame or the moving parts of the conveyor or associated equipment. The dividing walls are preferably, but not necessarily, attached to the flebile trough: for example, they can be supported by a superimposed endless chain or chains moving synchronously with the trough, permitting the dividing walls to depend or hang down into the trough. The transverse dividers 40 or 41, however, may be made of rubber, fabric, stiffened fabric, or other relatively soft or flexible material, depending upon the weight, mass or bulk of the material handled and transported; the requirement in this respect being that the transverse walls not be seriously disarranged so as to break up the compartmentalized nature of the endless train of compartments. It will be noted that the lower contour of the dividing wall 40 is angularly shaped to conform to the contour of the trough shown in Fig. 2, whereas the lower contour of the dividing wall 41 conforms to the curved contour of the trough shown in Fig. 5. Rigid bars or rods 43 may be provided to serve the dual function of spacing the opposite sides of the trough apart or of holding the chains a fixed distance apart and supporting the depending transverse partition walls 41. If it is desired to dispense with such rigid bars or rods 43, the structure shown in Fig. 6 may be used, wherein upright transverse walls or spacers 45 are connected, as by sewing (indicated by dotted lines at 46), to the base of the trough. These may be of fabric, rubber, or rigid material. As in the case of the spacers 41, these spacers serve as a common wall for adjacent compartments. When the transverse spacing walls are unsupported or of flexible material, it is desirable to use other means for spacing the chains or endless supports from each other. Vertical guard rails 47, such as shown in Fig. 5 may be provided along the inner edges of the angle irons 13 and 14. Of course, other equivalent arrangements may be used, such as a series of guide wheels 48 appropriately placed and supported on lugs 49 extending from the frame made up of the angle irons.

While I have shown a present preferred embodiment of my invention, it is to be understood that modifications may be made within the cognizance of those skilled in the art and therefore the scope of my invention is to be measured only by the appended claims.

What is claimed is:

1. A conveying belt comprising a pair of longitudinally extending supporting elements, a flexible trough supported adjacent each of its edges by one of said supporting elements, means for maintaining said elements a fixed distance apart from each other, and transverse dividing walls movable with said trough extending into said trough between said supporting elements, the edges of said walls being shaped in conformity with the contour of said trough, said shaped edges being spaced from the surface of said trough.

2. A conveying belt comprising a pair of longitudinally extending supporting elements, a flexible trough supported adjacent each of its edges by one of said supporting elements, means for maintaining said elements a fixed distance apart from each other, and transverse dividing walls movable with said trough and extending into said trough between said supporting elements, the edges of said walls being shaped in conformity with the contour of said trough, the lower edge of said dividing walls being separated from the surface of the trough.

3. A conveying belt comprising a pair of longitudinally extending supporting elements, a flexible trough supported adjacent each of its edges by one of said supporting elements, means for maintaining said elements a fixed distance apart from each other, and transverse dividing walls movable with said trough and extending into said trough between said supporting elements, the edges of said walls being shaped in conformity with the contour of said trough, the shaped edges of the dividing walls being movable with respect to the surface of the trough and normally out of contact with the surface of said trough.

4. A conveying belt comprising a pair of longitudinally extending supporting elements, a flexible trough supported adjacent each of its edges by one of said supporting elements, means for maintaining said elements a fixed distance apart from each other, and transverse dividing walls movable with said trough and extending into said trough between said supporting elements, the edges of said walls being shaped in conformity with the contour of said trough, said shaped edges being spaced from the surface of said trough, the dividing walls being free to move in relation to the trough.

5. A conveying belt comprising a pair of longitudinally extending supporting elements, a flexible trough supported adjacent each of its edges by one of said supporting elements, means for maintaining said elements a fixed distance apart from each other, and transverse metal dividing walls movable with said trough and extending into said trough between said supporting elements, the edges of said walls being shaped in conformity with the contour of said trough, the lower metal edge of said dividing walls being separated from the surface of the trough.

6. A conveying belt comprising a pair of longitudinally extending supporting elements, a flexible trough supported adjacent each of its edges by one of said supporting elements, means for maintaining said elements a fixed distance apart from each other, and transverse dividing walls of rigid material and movable with said trough and extending into said trough between said supporting elements, the edges of said walls being shaped in conformity with the contour of said trough, the lower rigid edge of said dividing walls being separated from the surface of the trough.

7. A conveying belt comprising a pair of supporting elements, a flexible trough supported adjacent each of its edges by one of said supporting elements, means for maintaining said elements a fixed distance apart from each other, and transverse dividing walls movable with said trough and extending into said trough between said supporting elements, the edges of said walls being shaped in conformity with the contour of said trough, said shaped edges being spaced from the surface of said trough.

EDWARD F. HANSEN.

References Cited in the file of this patent
UNITED STATES PATENTS

| Number | Name | Date |
|---|---|---|
| 781,138 | Etcheverry | Jan. 31, 1905 |
| 1,559,772 | Peale | Nov. 3, 1925 |
| 2,264,332 | Peterson | Dec. 2, 1941 |